(12) United States Patent
Santarossa

(10) Patent No.: US 6,250,261 B1
(45) Date of Patent: Jun. 26, 2001

(54) DEVICE FOR FEEDING NATURAL COMPRESSED GAS TO A DIESEL ENGINE

(76) Inventor: Hector Francisco Santarossa, Bermejo 3374, San Justo, Provincia de Buenos Aires (AR)

( * ) Notice: Subject to any disclaimer, the term of this patent is extended or adjusted under 35 U.S.C. 154(b) by 0 days.

(21) Appl. No.: 09/514,175

(22) Filed: Feb. 28, 2000

(51) Int. Cl.$^7$ .................................................. F02M 21/04
(52) U.S. Cl. ..................................... 123/27 GE; 123/527
(58) Field of Search ............................. 123/27 GE, 526, 123/527, 590, DIG. 7

(56) References Cited

U.S. PATENT DOCUMENTS

| | | | |
|---|---|---|---|
| 4,019,483 | * | 4/1977 | Konomi et al. ........................ 123/590 |
| 4,696,278 | * | 9/1987 | Ito et al. ............................... 123/527 |
| 5,330,031 | * | 7/1994 | Hill et al. .............................. 123/527 |
| 5,408,967 | * | 4/1995 | Foster ................................. 123/27 GE |
| 5,487,362 | * | 1/1996 | Wellev et al. ..................... 123/27 GE |
| 5,692,478 | * | 12/1997 | Nogi et al. ............................. 123/527 |
| 5,996,558 | * | 12/1999 | Ouellette et al. ................. 123/27 GE |
| 6,050,246 | * | 4/2000 | Abdelmesih ......................... 123/527 |

\* cited by examiner

*Primary Examiner*—Marguerite McMahon
(74) *Attorney, Agent, or Firm*—Sterne, Kessler, Goldstein & Fox, PLLC

(57) ABSTRACT

Diesel engine conversion kit wherein said kit arranged at the engine air inlet of a diesel engine to be transformed, comprises three different pieces defining an air inlet means, gas feeding means and flux regulating means. Said air inlet means comprises a hollow cylindrical piece with a central narrowed position affixed to said gas feeding means. Said gas feeding means comprises passages whose arrangement coincides with the arrangement of the above cited inlet. Inside said passages feeding gas tubes including long gas exit grooves, are lodged. Finally said flux regulating means comprises a plate with two feeding passages in coincidence with the above cited passages of gas feeding means, each including choker plates with a common regulating means.

4 Claims, 2 Drawing Sheets

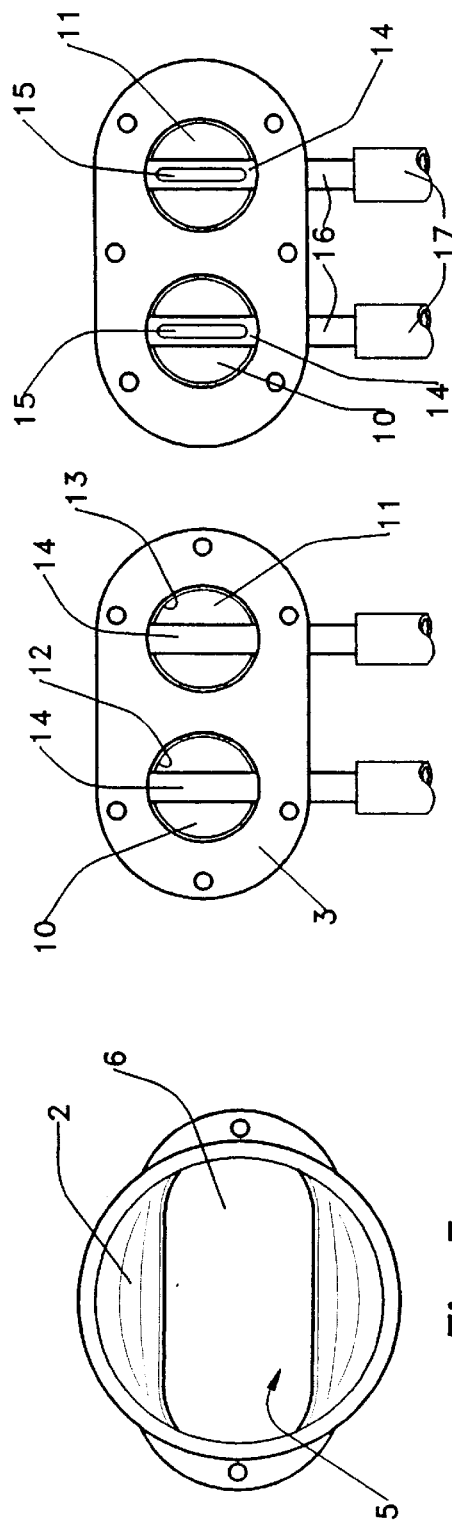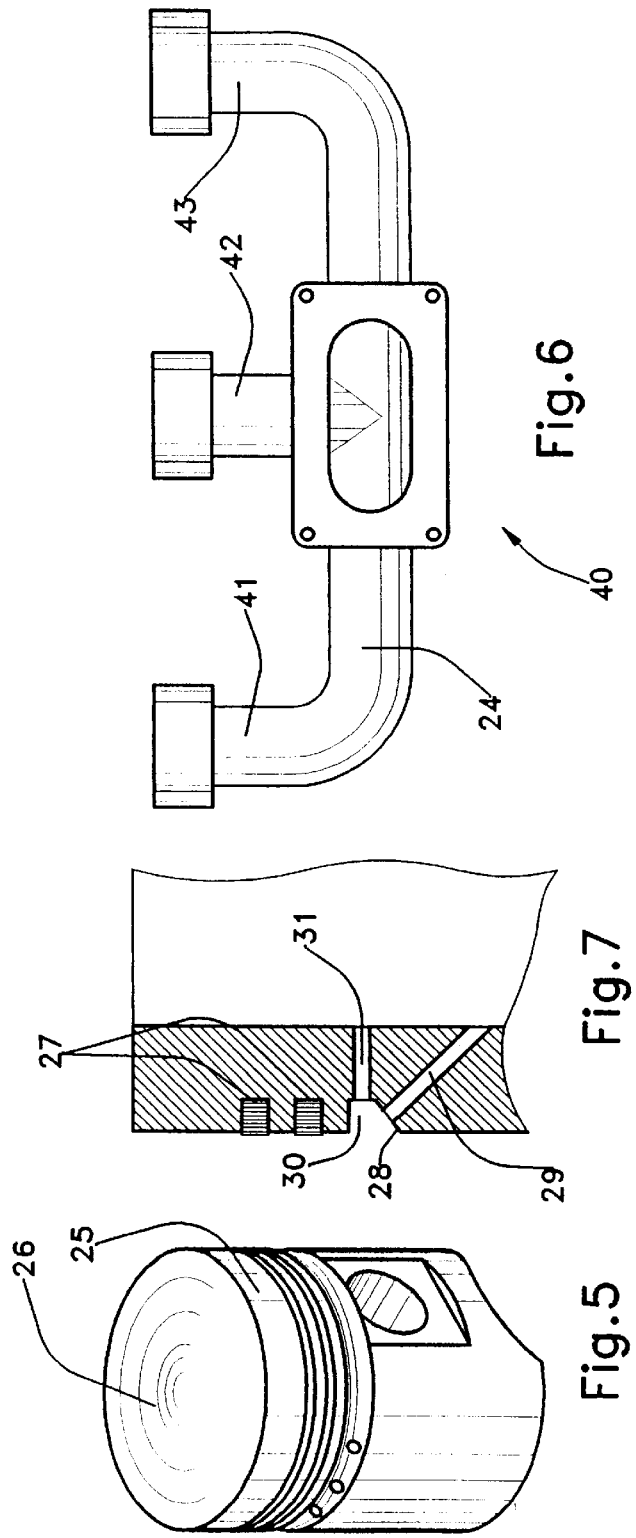

US 6,250,261 B1

DEVICE FOR FEEDING NATURAL COMPRESSED GAS TO A DIESEL ENGINE

FIELD OF THE INVENTION

In general terms the present invention is related to a special device for feeding natural compressed gas to an engine with which is possible to replace the fuel originally used to feed this Diesel engine. Basically, this invention is addressed to replace diesel fuel since it has been scientifically demonstrated that exhaust gasses expelled from this kind of diesel engine pollute the air. At the same time it has also been scientifically demonstrated that natural compressed gas generates no contaminating particles during combustion.

BACKGROUND OF THE INVENTION

It seems to be redundant to enumerate the different advantages of using natural compressed gas for feeding automotive engines. As proof thereof there are different cities like Buenos Aires, Argentina in which there are thousands of cars which have changed the original fuel used for feeding the engine, making an important contribution worldwide. Problems related with the ozone hole created by contaminating gasses is a worldwide concern and each country should contribute to overcome this problem.

Contamination is not the only goal of the present development since it has been demonstrated that natural compressed gas involves several advantages for the engine, for example a better and cleaner operation of engine is achieved in comparison with the prior art Diesel engines. It is very important to take into account that the mere use of natural compressed gas as engine fuel does not automatically involve an improvement in the engine operation as well as a pollution decrease. On the contrary, an engine fed with natural compressed gas improperly may generate a greater amount of nitrogen oxide particles, which is one of the most toxic components of a vehicle exhaust gas together with carbon monoxide. Therefore a sole replacement of fuels does not automatically mean an improvement for the engine and the environment.

It has been scientifically demonstrated that an original diesel engine improperly fed with natural compressed gas may involve generating a greater quantity of contaminating particles than the original fuel.

There are several developments in the market for transforming from original diesel fuel to natural compressed gas. None of them feeds the engine properly. They basically consist of installing a carburator in the air inlet, spark plugs in the fuel injector's place and an electric distributor device replacing the original fuel pump. This kind of device does not take into account the above cited problem of air and gas weight therefore improper feeding of the engine involves creating pollution particles as was explained above.

Therefore, there is still market need to provide means capable of replacing the original polluting fuels by other alternative non-pollution fuels like natural gas electricity.

National, State and County authorities of different countries are becoming more and more aware of problems related with pollution and costs related with different diseases created by air pollution like lung cancer.

SUMMARY OF THE INVENTION

In order to solve the above-cited problems the present invention is a kit for transforming an original diesel engine so as to feed this engine with natural compressed gas. There are some cities in the world like the city of Mendoza in Argentina, in which the authorities have imposed a rule based on an analysis criteria called "from exhaust gas exit to outside" for decreasing the air pollution. This rule does not take into account the kind of engine, fuel, system, etc. used, the only important feature for this analysis is that the exhausting gasses generated by the engine can not include polluting particles. Thus, several engine manufactures have developed different diesel developments which exhaust gas analysis has demonstrated that they create lesser contaminating particles than several natural compressed gas engines. Said developments do not solve pollution problems due to their extremely high price, which is greater than a new conventional engine, therefore it seems to be inaccessible for a bus owner.

One of the main objects of the present invention is to transform used diesel engines by using a cheap, easy to install, low installation cost kit which creates no contaminating particles increasing the engine efficiency.

The present invention is referred to as a transformation kit for original diesel engines so that diesel fuel is replaced by natural compressed gas and the engine changes from diesel cycle to Otto cycle. Basically, the purposed invention is related with the way in which the fuel comes into the engine because some other modifications which also should be done in the engine seems to be obvious for any person skilled in the art. Any person skilled in the art may deduct that if an original diesel cycle engine should be transformed to an Otto cycle engine spark plugs should be included in the combustion chamber so as to generate sparks for starting the explosion. These spark plugs can only be lodged in a sole place: the place in which the original diesel engine lodged the diesel injector tips. At the same time an electric distribution device should also be included for electrically exciting the spark plugs in each cycle, therefore a conventional electrical distributor device is included in this kind of transformation and it is lodged in the place where the original diesel engine lodged the fuel bomb. All these changes seem to be obvious for any person skilled in the art and they will not be described in detail in the present specification.

There is still a market need for a transformation engine kit capable of properly feeding a gas to a diesel engine. Natural gas is so much lighter than the air, and in order to avoid contaminating particles in the exhaust gas a gas-air ratio of 14-1 should be achieved. The present invention comprises a transformation kit for feeding the engine cylinders in a complete and even way and at the same time running an important increase in the engine power. An optimal use of fuel and a complete combustion of fuel are achieved in the combustion chamber.

Even when there are several diesel engine transformation kits in the market for adapting this fuel to the existing diesel engines, none of them has achieved a proper function of engine operation, no increase in the engine output is achieved like in the present case, excessive amount of oil is consumed and they usually have a short useful life since they usually work at high temperatures affecting the life time of the engine structure.

The transformation kit of the present invention achieves, due to the new improved feeding characteristics, a low temperature at the combustion chamber of each cylinder lower than the temperature usually found in other gas engines. This is a clear demonstration of the optimal use of fuel in each cycle using the purposed kit.

Summing up, the present invention is referred to a diesel engine conversion kit for feeding with natural compressed gas a diesel engine wherein said kit comprises feeding means arranged at the air inlet of the diesel engine to be transformed, such feeding means comprises a base plate including two feeding inlets, each including flux regulation means. A gas feeding means is also include in said plate comprising a body with two passages which arrangement coincides with the arrangement of the above cited inlet of set plate: Inside said passages pressing gas injector tubes are lodged including long gas exit grooves. Finally upward of said feeding means an air inlet means is provided defining a unique air passage and including a central narrowed portion.

Using the above describe means an easy regulation of fuel inlet inside the engine is achieved. It is very important to point out that the purposed kit may be adapted to transform different kind of diesel engines without changing the kit design. It may be easily adapted to different types of diesel engines without any need of manufacturing different kinds of pieces, optimizing the kit costs and achieving an excellent behavior of the engine.

BRIEF DESCRIPTION OF DRAWINGS

The present specification is complemented with the set of drawings attached which should be interpreted as an illustration of an alternative embodiment of invention and not as a limitation thereof.

FIG. 3 shows in detail the air inlet means. An air filter is usually attached thereto, but it is not shown for clarity purposes.

FIGS. 4A and 4B show upper and inner plant views of feeding means.

FIG. 5 is a perspective view of the improved cylinder of the present invention completing the improvements purposed by the present invention.

FIG. 6 shows in detail the intake manifold of the purpose kit.

FIG. 7 is a cross sectional view of the purposed piston which forms part of the improvements introduced by the present invention.

DETAILED DESCRIPTION OF THE INVENTION

Figure 2:
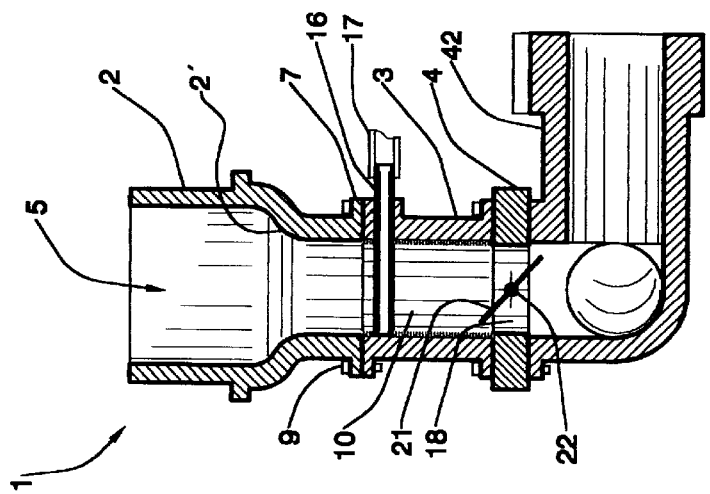
FIG. 2 is a longitudinal cross section of the kit of FIG. 1 set.
Figure 1:
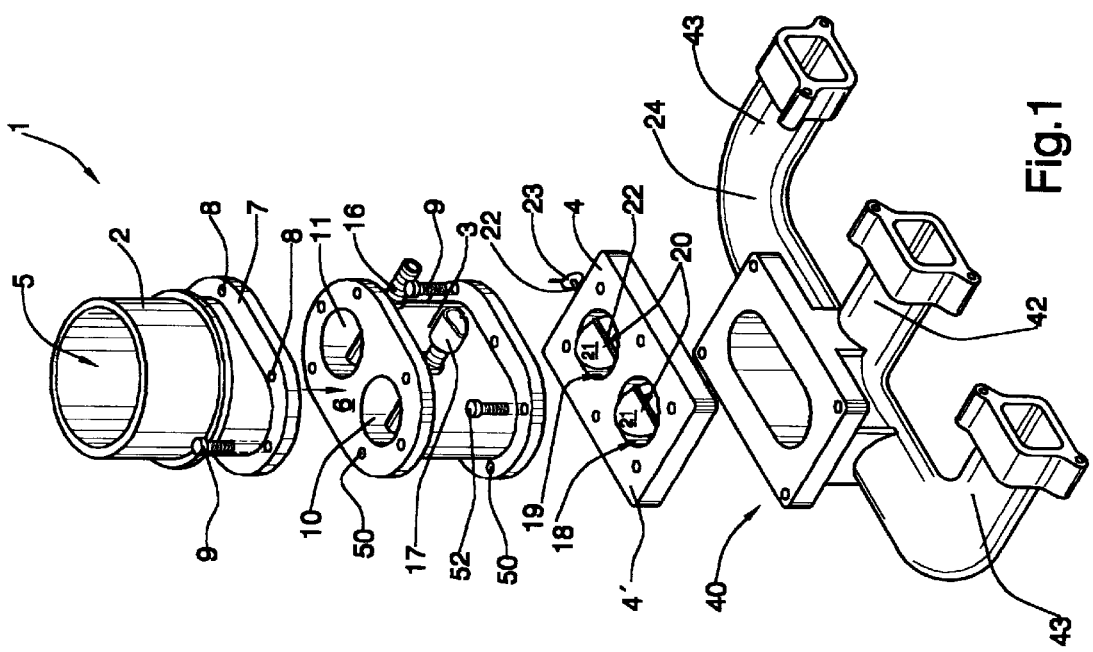
FIG. 1 is a perspective view of the proposed kit comprising three different pieces defining the propose feeding.

Referring first to FIGS. 1–4 of the attached drawings the purposed conversion kit of an original diesel-cycle engine to an Otto-cycle engine to be fed with natural compressed gas in accordance with the present invention is illustrated. Said kit 1 comprises three different pieces 2,3 and 4, each defining the above mentioned air inlet means, gas feeding means and flux regulating means respectively.

Said air inlet means 2 has a unique inlet 5 and a unique outlet 6 of air. It is a rigid hollow cylindrical metallic piece obtained for example in aluminum, having a central narrowed portion 2' for accelerating the air flux entering in the engine during operation for forming the carburant mix.

Regarding inlet 5 an air filter is usually provided (not illustrated) and the outlet 6 includes a flange 7 with holes 8 where bolts 9 are lodged for fixing said piece 2 to the second piece 3, which define said gas feeding means.

Said gas feeding means 3 comprises a solid hollow piece defining two passages 10,11 both in communication with the unique passage defined by piece 2. Said passages 10,11 split the air flux containing from piece 2 in two air fluxes and each passage 10,11 has a central narrowed portion created by respective interchangeable jackets 12,13 with which an increase in the air velocity is achieved.

Said jackets 12,13 are fixed with bolts (not illustrated) to piece 3 defining a central narrowed portion like a venturi. Since gas is lighter than air only air should be accelerated with the above mentioned narrowed portion in order to avoid gas reaching the engine cylinder faster than the air improperly feeding the engine.

Moreover each passage 10,11 includes a hollow cylindrical gas feeding tube 14, which is introduced into piece 3 transversely regarding the longitudinal axis of these passages. That is, air flux coming from piece 2 hits against said gas feeding tubes 14 since it is arranged like a passage diameter. Each of said tubes 14 has a long groove 15 for injecting gas to the cylinder. Said grooves 15 are located downwards facing the cylinders. Each of said tubes 14 include an end 16 in which the end of a gas feeding hose 17 is fixed. Said hose 17 feeds gas coming from gas tubes (not illustrated) and before arriving to tube ends 16 it is properly decompressed from storing pressure (200 bars) to feeding pressure of approximately 1 bar. Said means (tubes, decompressing means) are not illustrated as they are well known for any person skilled in the art.

The above cited piece 3 also includes respective holes 50 for coupling said piece 3 to piece 2 using bolts 9 and for assembling piece 3 to a last piece 4 using bolts 52.

Piece 4 defines the above cited flux regulating means comprising a plate 4' including two holes 18,19 each coinciding respectively with passages 10,11 of piece 3. Air flux from the above cited pieces 2,3 is then regulated by regulating means 20 defined by a choker plate 21 fixed to a common axis 22 which simultaneously controls both choker plates through a rotating means 23 related to the vehicle's accelerator pedal. Obviously once said choker plates 21 are opened, that is vertically positioned, the carburant fuel flux entering in the engine is increased.

This plate 41 is the last piece of this feeding set proposed by the present invention and is coupled to the air inlet of the diesel engine to be transformed. Each hole 18,19 of said plate 41 defines a gas feeding inlet communicated to inlet manifold 24 of the engine.

With the above described feeding means the engine operation is considerably improved by generating a complete even and controlled feeding of said engine optimizing the use of gas power generated in each cycle but without generating dissipation of heat from the engine. That is if the engine generates an excessive amount of heat it means that a great part of the heat energy generated in each explosion is dissipated by radiation through the engine block or through several parts of said engines instead of using said energy to impel the vehicle.

The purposed set is complemented with an intake manifold 40 including three branches 41–43 each having an inner diameter and a length specially calculated in accordance with the cylinder capacity, piston diameter, and compression relationship of the engine. The length of said branches are calculated considering that if said branches would have the same lengths then the center arranged cylinder would be excessively fed and the other cylinders would be insufficiently fed. Then branch 42 has a lesser diameter than branches 41 and 43.

In order to complete the purposed improvements of the present invention a mew amended piston is also proposed (see FIG. 7) since the original diesel engine piston is not useful for generating a proper operation of it. As it is well known in the prior art, diesel engine pistons include a hollow head due to the kind of compression this fuel needs. In the particular case of a diesel engine of Mercedes Benz, the piston head should be completely flat, but this should not be interpreted as a limitation of the present invention. In this particular case described and illustrated the piston head is flat without hollow parts or rejecting parts. This piston 25 has a flat head 26, as well as grooves over the outer surface 27 for lodging the piston rings. Said piston also includes an orifice 29 defining a lubricating oil passage from the piston skirt and from the cylinder to the engine's oil pan. Moreover this piston includes a last groove 30 having an oil passage 31 for lubricating the piston itself as well as a return passage of oil to the oil pan. Both orifices 29,31 define passages to the oil pan, but the difference between them resides in that orifice 29 defines a first oil passage to the oil pan for avoiding an excessive amount of oil reaching the combustion chamber, because in this case contaminating gases would be generated and the normal operation of the engine could be affected.

Second orifice 31 discharges oil to the oil pan therefore both orifices work together so as to achieve a proper lubrication of engine parts without burning said oil into the combustion chamber.

What is claimed is:

1. A diesel engine conversion kit wherein said kit is arranged at the engine air inlet of a diesel engine to be transformed, comprising:

three different pieces defining an air inlet means, gas feeding means and flux regulating means, said air inlet means comprising a hollow cylindrical piece with a central narrowed position affixed to said gas feeding means, said gas feeding means comprising passages whose arrangement coincides with the arrangement of said inlet, feeding gas tubes including long gas exit grooves lodged inside said passages, said flux regulating means comprising a base plate with two feeding passages in coincidence with said passages of said gas feeding means, each including choker plates with a common regulating means.

2. The diesel engine conversion kit, in accordance with claim 1, wherein said base plate of said flux regulating means is fixed to an inlet manifold including a first central branch and two lateral branches, whereby the central branch is shorter than the other branches and its inner diameter is smaller than the other branches' diameter.

3. The diesel engine conversion kit, in accordance with claim 1, wherein the central narrowed portion of each passage of said gas feeding means comprises an interchangeable jacket capable of being fixed to the cylindrical inner wall of said passages.

4. The diesel engine conversion kit, in accordance with claim 1, wherein said kit further comprises a new piston having two oil passages for returning extra oil to an oil pan.

* * * * *